United States Patent
Mrdeza et al.

(10) Patent No.: US 7,159,423 B1
(45) Date of Patent: Jan. 9, 2007

(54) HELMET LOCKING DEVICE

(75) Inventors: Matthew N. Mrdeza, Whittier, CA (US); Joseph B. Gschweng, Norwalk, CA (US)

(73) Assignee: Kewlmetal, Inc., Prescott, AZ (US)

( * ) Notice: Subject to any disclaimer, the term of this patent is extended or adjusted under 35 U.S.C. 154(b) by 104 days.

(21) Appl. No.: 11/015,118

(22) Filed: Nov. 18, 2004

(51) Int. Cl.
E05B 69/00 (2006.01)

(52) U.S. Cl. ............... 70/59; 70/33; 70/233; 74/551.8; 224/420; 224/451; 248/553

(58) Field of Classification Search ............ 70/33, 70/59, 223–236, 417, 62, 57, 258, 31, 32, 70/58, 60, 61; 74/551.8, 551.9; 224/413, 224/420, 451; 248/551–553
See application file for complete search history.

(56) References Cited

U.S. PATENT DOCUMENTS

| | | | | |
|---|---|---|---|---|
| 2,104,981 A * | 1/1938 | Falk | ............... | 70/33 |
| 3,759,072 A * | 9/1973 | MaLarnon | ............... | 70/59 |
| 3,800,575 A * | 4/1974 | Perret, III | ............... | 70/233 |
| 3,918,323 A * | 11/1975 | Prager | ............... | 74/551.8 |
| 4,065,945 A | 1/1978 | Jaulmes | | |
| 4,073,172 A * | 2/1978 | Schlage | ............... | 70/417 |
| 4,186,576 A * | 2/1980 | Means et al. | ............... | 70/233 |
| 4,274,271 A | 6/1981 | Todd et al. | | |
| 4,708,007 A * | 11/1987 | Stoia | ............... | 70/451 |
| 4,887,444 A * | 12/1989 | de Brouwer-Elzenbroek et al. | ............... | 70/233 |
| 5,193,664 A * | 3/1993 | Ives | ............... | 200/43.01 |
| 5,937,678 A * | 8/1999 | Kuo | ............... | 70/18 |
| 6,536,246 B1 | 3/2003 | Wilson et al. | | |
| 6,553,793 B1 * | 4/2003 | Chen | ............... | 70/33 |
| 6,698,257 B1 | 3/2004 | Kulas | | |
| 6,923,027 B1 * | 8/2005 | Kuo | ............... | 70/49 |

* cited by examiner

Primary Examiner—Lloyd A. Gali
(74) Attorney, Agent, or Firm—Kenneth L. Green; Edgar W. Averill, Jr.

(57) ABSTRACT

A motorcycle helmet lock securely grasps a metal strap ring (or D ring) of a helmet strap to prevent helmet theft. The helmet lock includes a groove suitable to accept the strap ring and a locking bolt to advance through the strap ring to secure the helmet. The lock may be an integral part of a motorcycle grip or foot peg, may bolt to a common accessory attachment interface of known motorcycle grips, or include an expanding portion which expands inside a tubular handlebar end to attach the helmet lock. The lock may further be used on any type of vehicle using handlebars for foot pegs.

20 Claims, 4 Drawing Sheets

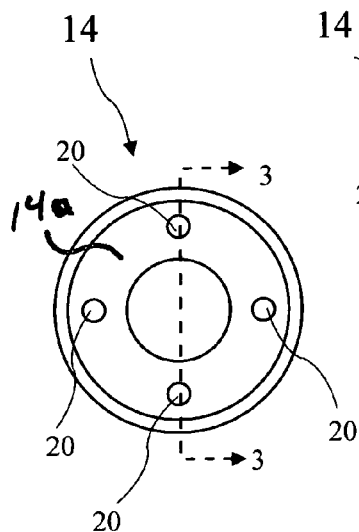
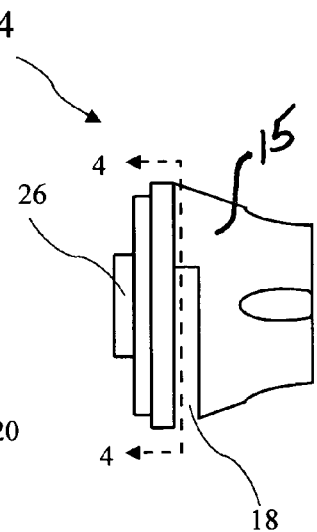
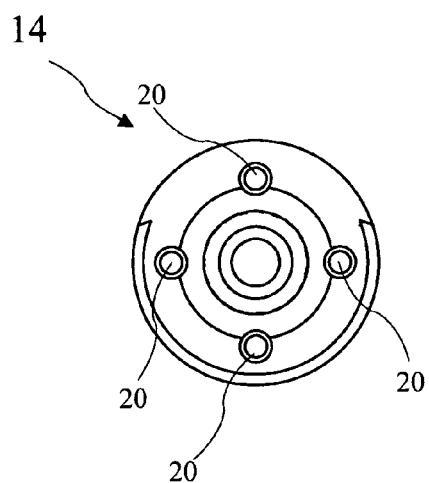
FIG. 2B    FIG. 2A    FIG. 2C
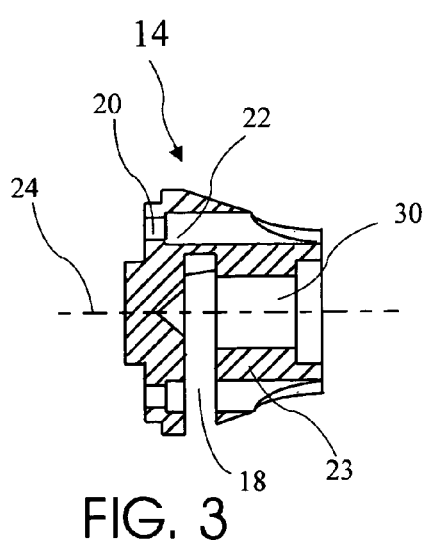
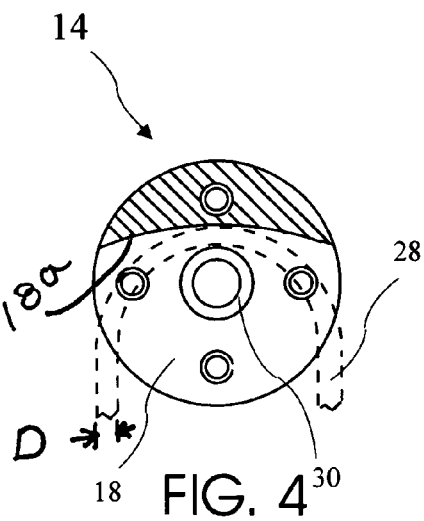
FIG. 3    FIG. 4

HELMET LOCKING DEVICE

BACKGROUND OF THE INVENTION

The present invention relates to locking devices for helmets and in particular to a handle bar end or foot peg end lock for motorcycle helmets.

Both for safety, and to comply with helmet laws, most motorcycle riders wear helmets. While modern helmets have been made lighter and stronger than traditional helmets, the helmets remain somewhat inconvenient to carry about at a destination point.

Locks are known for locking a helmet to a motorcycle. For example, U.S. Pat. No. 4,065,945 for "Anti-Theft Device for Helmet and Helmet for Use With the Device," describes a cage-like structure which resides on a motorcycle gas tank. Disadvantageously, the device of the '945 patent is unattractive, and may damage the gas tank. Most motorcycle riders are very particular about the appearance of their motorcycles, and would find both the appearance and damage to the gas tank unacceptable.

Another helmet lock is described by U.S. Pat. No. 4,274,271 for "Helmet Locking Device." The '271 patent describes a lock which clamps about a round member of a motorcycle, such as handlebars, crash bars, frame member, or the like. While the lock of the '271 patent provides greater versatility than the lock of the '945 patent, it still has several drawbacks. The lock of the '271 patent appears bulky, and may interfere with other features of a motorcycle, or snag on clothing, such as a motorcycle jacket. The lock of the '271 patent positions the helmet close to the motorcycle, and contact between the helmet and motorcycle may result, causing damage to the helmet, the motorcycle, or both. The bulky appearance is also likely to be unacceptable to many motorcycle riders.

U.S. Pat. No. 6,698,257 for "Motorcycle Lock Using Front Fork Lock," describes a securing member 120 which is attached to the end of a handlebar grip. Unfortunately, the lock of the '257 patent positions the helmet against the gas tank or motorcycle fairing, and damage to the helmet and/or motorcycle is likely to eventually result.

A lock which attached to the end of a handebar grip is described in U.S. Pat. No. 6,536,246 for "Retaining Device for Personal Vehicle With Handlebars." The lock of the '246 patent attached to the handlebar end using an expandable hub which is expanded withing a tubular handlebar end, and a "shackle, a cable, or a spring loaded lever which extends out of the distal end of the handlebar." Unfortunately, by extending from the handlebar, the lock of the '246 patent is vulnerable to cutting or breaking. Further, although the device of the '246 patent provides a helmet lock which cooperates with tubular handlebars, it does not take advantage of accessory mounting features of newer style grips such as the Kuryakyn® ISO® grip.

BRIEF SUMMARY OF THE INVENTION

The present invention addresses the above and other needs by providing a motorcycle helmet lock which securely grasps a metal strap ring (or D ring) of a helmet strap to prevent helmet theft. The helmet lock includes a groove suitable to accept the strap ring and a locking bolt to advance through the strap ring to secure the helmet. The lock may be an integral part of a motorcycle grip or foot peg, may bolt to a common accessory attachment interface of known motorcycle grips, or include an expanding portion which expands inside a tubular handlebar end to attach the helmet lock. The lock may further be used on any type of vehicle using handlebars for foot pegs.

In accordance with one aspect of the invention, there is provided a helmet lock comprising a lock body adapted to attach to a handlebar grip, a groove in the lock body adapted to accept a helmet strap ring, and a bolt adapted to advance through the groove. The bolt is positioned to pass through the strap ring thereby prevent removal of the strap ring from the lock body. The lock body is preferably adapted to attach to a handlebar grip having four threaded holes for accessory attachment on the end of the grip and the lock body includes attaching holes for aligning with the four threaded holes. In order to match a preferred grip, the lock body is preferably a machined billet lock body.

In accordance with another aspect of the invention, there is provided a handlebar grip body having a mounting end, a gripping portion, and an outside end. A groove is formed in the grip body, which the groove is proximal to the outside end and adapted to accept a helmet strap ring. A bolt is adapted to advance through the groove, which bolt is positioned to pass through the strap ring thereby prevent removal of the strap ring from the lock body. The lock body is preferably a truncated conical lock body having a lock body axis. The groove is substantially perpendicular to the lock body axis, and the bolt is substantially coaxial with the lock body axis.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2A is a side view of the helmet lock.

FIG. 2B is an end view of the helmet lock showing a mounting surface of the helmet lock.

FIG. 2C is an end view of the helmet lock showing a lock end surface of the helmet lock.

FIG. 3 is a cross-sectional view of the helmet lock taken along line 3—3 of FIG. 2B.

FIG. 4 is a cross-sectional view of the helmet lock taken along line 4—4 of FIG. 2A.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
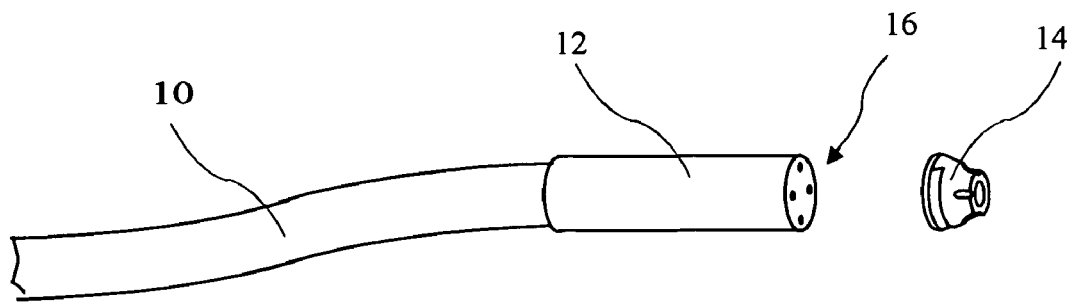
FIG. 1A is a handlebar with a grip and a detached helmet lock according to the present invention.
Figure 1B:
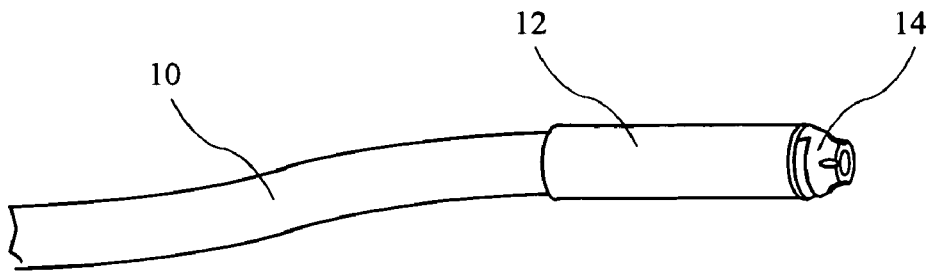
FIG. 1B is the handlebar and grip with the helmet lock attached to the grip.
Figure 1C:
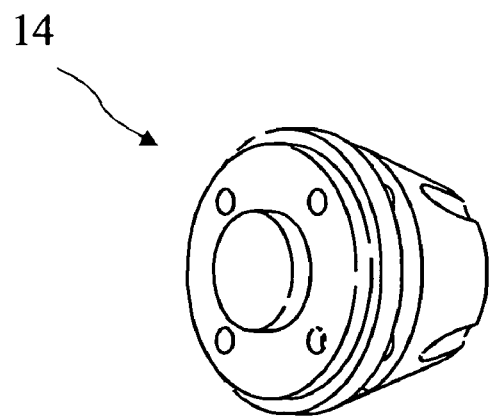
FIG. 1C is a detailed perspective view of the helmet lock.

A handlebar 10 with a grip 12 and a detached helmet lock 14 according to the present invention is shown in FIG. 1A. The grip 12 includes accessory attachment features 16 which the helmet lock 14 is adapted to attach to. The handlebar 10 and grip 12 with the helmet lock 14 attached to the grip 12 is shown in FIG. 1B, and a detailed perspective view of the helmet lock 14 is shown in FIG. 1C. The helmet lock 14 is preferably shaped as a truncated cone, a cylinder, or a hemisphere, and more preferably shaped as a truncated cone.

A side view of the helmet lock 14 is shown in FIG. 2A, an end view of the helmet lock 14 showing a mounting surface 14a of the helmet lock 14 is shown in FIG. 2B, and an end view of the helmet lock 14 showing a lock end surface of the helmet lock 14 is shown in FIG. 2C. The helmet lock 14 includes a lock body 15 having four attaching holes 20 sized and positioned to cooperate with the accessory attachment features 16 (see FIG. 1A), and an alignment feature 26. Such accessory attachment features 16 is, for example, present on the Kuryakyn® ISO® grip made by Kuryakyn® in Somerset, Wis. A groove 18 is provided in the lock body 15 to allow a helmet strap ring 28 (see FIG. 4) to be inserted into the helmet lock body 23 (see FIG. 3).

A cross-sectional view of the helmet lock 14 taken along line 3—3 of FIG. 2B is shown in FIG. 3. The lock body 23 includes a lock recess 30 to allow a lock 32 (see FIG. 5) to be installed in the lock body 23. The lock recess 30 may, for example, be a threaded lock recess, and the lock 32 may, for example, screw into the lock recess 30. The attaching holes 20 pass through the lock body 23, and stepped recesses 22 allow mounting screws to be recessed into the lock body 23 beyond the groove 18. The groove 18 is substantially perpendicular to the lock body axis 24, and the lock recess 30 (and thus the lock 32 and bolt 34) is substantially coaxial with the lock body axis 24. Within this context, "substantially" is taken as within reasonable manufacturing tolerances, and/or appearing to the perpendicular and coaxial to a typical observer.

A cross-sectional view of the helmet lock 14 taken along line 4—4 of FIG. 2A is shown in FIG. 4. The strap ring 28 is shown residing in the groove 18. The strap ring 28 resides above the lock recess 30, and the groove 18 is formed to provide sufficient space for the strap ring 28 to reside above a bolt 34 of the lock 32 (see FIG. 5B) when the lock 32 is in a locked position. For example, the groove 18 includes a concave face 18a extending into the lock body 23 a distance past a lock body axis 24 of at least the bolt 34 radius plus the strap ring 28 diameter D. An example of a lock suitable for use with the present invention is a Miniature Tubular Push in Plunder Lock part number 2625 available from ABA Locks USA in San Dimas, Calif.

Figure 5:
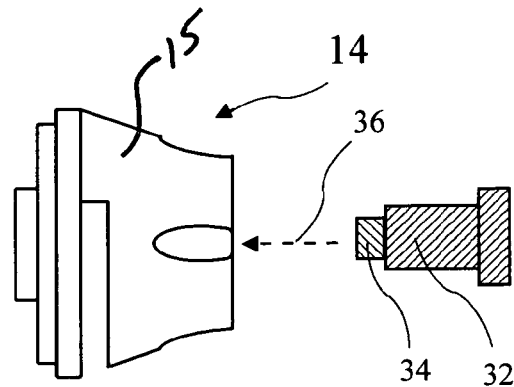
FIG. 5 shows the helmet lock and a lock suitable for use with the helmet lock.
Figure 5A:
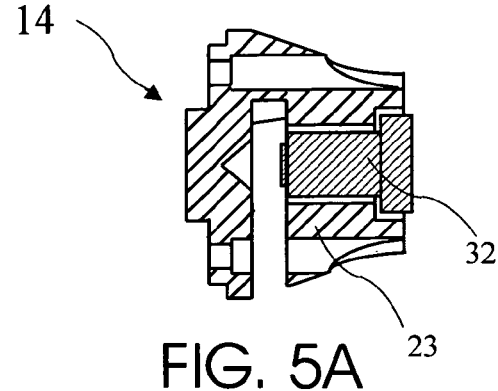
FIG. 5A is a cross-sectional view of the helmet lock taken along line 3—3 of FIG. 2B, with the lock residing in the helmet lock body with a bolt in an unlocked position.
Figure 5B:
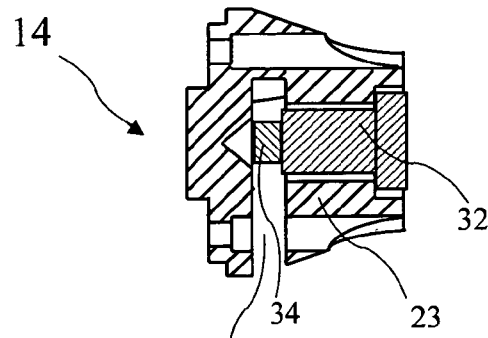
FIG. 5B is a cross-sectional view of the helmet lock taken along line 3—3 of FIG. 2B, with the lock residing in the helmet lock body with the bolt in a locked position.

The helmet lock 14 and a lock 32 suitable for use with the helmet lock 14, is shown with a bolt 34 extending from the lock 32 in FIG. 5. A cross-sectional view of the helmet lock 14 taken along line 3—3 of FIG. 2B, with the lock 32 residing in the helmet lock body 23 with the bolt 34 in an unlocked position is shown in FIG. 5A. A cross-sectional view of the helmet lock 14 taken along line 3—3 of FIG. 2B, with the lock 32 residing in the helmet lock body 23 with the bolt 34 in a locked position is shown in FIG. 5B, whereby the strap ring 28 may be secured in the lock body 23.

Figure 6:
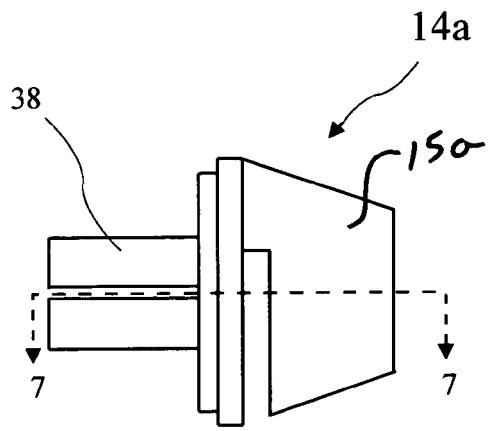
FIG. 6 is a side view of a second helmet lock according to the present invention, adapted to cooperate with a tubular handlebar end.
Figure 7:
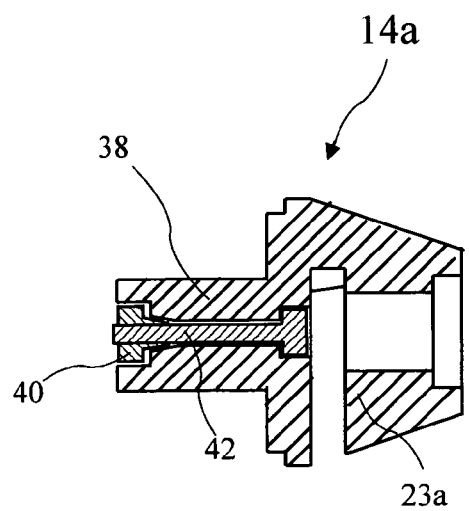
FIG. 7 is a cross-sectional view of the second helmet lock taken along line 7—7 of FIG. 6.

A side view of a second helmet lock 14a adapted to cooperate with a tubular handlebar end is shown in FIG. 6. A cross-sectional view of the second helmet lock 14a taken along line 7—7 of FIG. 6 is shown in FIG. 7. The second lock body 23a of the helmet lock 14a includes a expanding portion 38 which may be inserted (when not expanded) into an end of the tubular handlebar. An expansion nut 40 is held in the expansion portion 38, and when an expansion screw 42 is tightened, the expansion nut 40 is drawn into the expansion portion 38, thus expanding the expansion portion 38 to secure the helmet lock 14a to the tubular handlebar end. A helmet lock suitable for use with tubular handlebars may include any means for expanding an expanding portion of the helmet lock inside the tubular handlebars, for example, a rubber member which may be axially squeezed to increase the rubber member's outside diameter. A helmet lock with a groove and bolt as described above, with any expanding portion, is intended to come withing the scope of the present invention.

Figure 8:
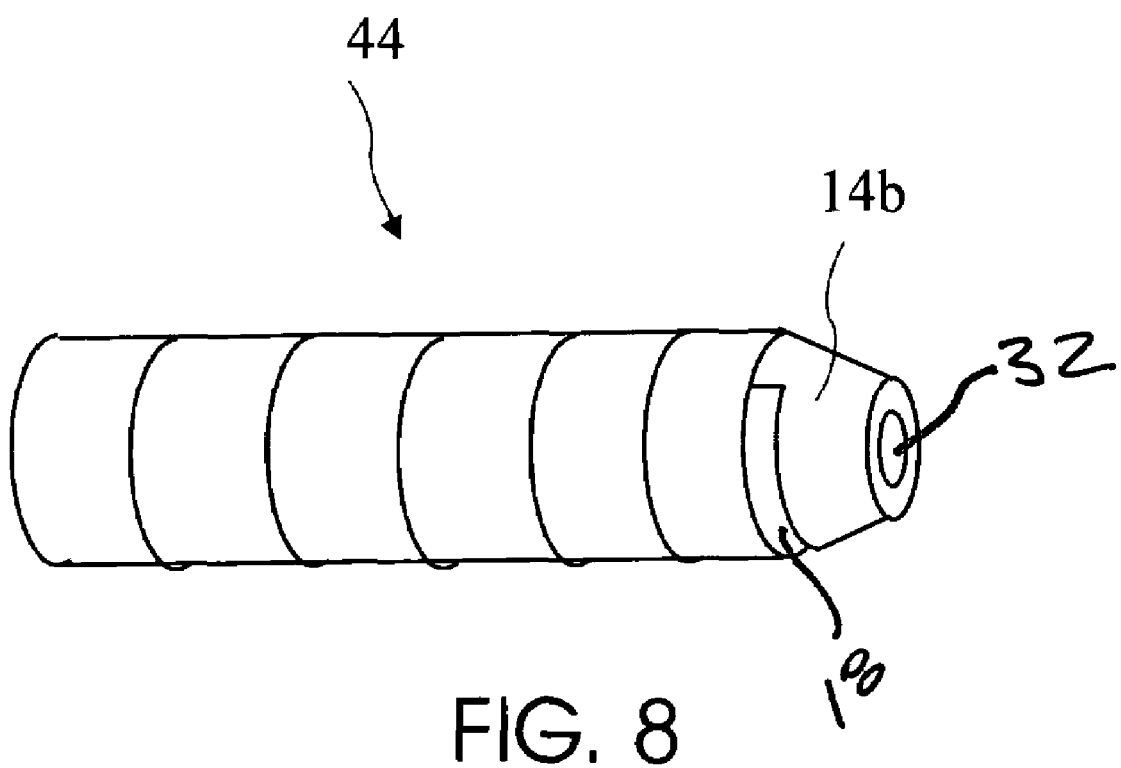
FIG. 8 is a perspective view of a handlebar grip or foot peg with an integrated helmet lock according to the present invention.

A perspective view of a handlebar grip or foot peg 44 with an integrated helmet lock 14b is shown in FIG. 8. Other than attachment features, the integrated helmet lock 14b is substantially the same as the helmet lock 14. For example, the integrated helmet lock 14b includes the groove 18 and the lock 32 (see FIGS. 5, 5A, and 5B).

While the invention herein disclosed has been described by means of specific embodiments and applications thereof, numerous modifications and variations could be made thereto by those skilled in the art without departing from the scope of the invention set forth in the claims.

We claim:

1. A helmet lock comprising:
   a lock body;
   a round mounting surface end of the lock body, the mounting surface end including attachment holes for cooperation with an attaching feature residing at the end of a grip;
   a cylindrical lock mechanism residing coaxial with the lock body and perpendicular to the mounting surface and including a bolt residing coaxial with the cylindrical lock mechanism; and
   a groove in the lock body adapted to accept a helmet strap ring and extending into the lock body a distance past a lock body axis of at least a bolt radius plus a strap ring diameter D, wherein the bolt is adapted to be advanceable through the groove, whereby the bolt is positionable to pass through the strap ring to thereby prevent removal of the strap ring from the lock body.

2. The helmet lock of claim 1, wherein the lock mechanism locks the bolt in an unlocked position and in a locked position.

3. The helmet lock of claim 1, wherein the groove includes a concave face extending into the lock body.

4. The helmet lock of claim 3, wherein the concave face extends into the lock body a distance past a lock body axis of at least a bolt radius plus a strap ring diameter D.

5. The helmet lock of claim 1, wherein the lock body is adapted to attach to a handlebar grip having an accessory attachment feature on an end of the grip.

6. The helmet lock of claim 5, wherein the lock body is adapted to attach to a handlebar grip having four threaded holes for accessory attachment on the end of the grip, wherein the lock body includes attaching holes adapted to align with the four threaded holes.

7. The helmet lock of claim 1, wherein the lock body is part of a handlebar grip.

8. The helmet lock of claim 1, wherein the lock body is part of a foot peg.

9. The helmet lock of claim 1, wherein:
the lock body is of a shape selected from a group consisting of a cylindrical lock body, a truncated conical lock body, and a hemispherical lock body;
the lock body has a lock body axis;
the groove is perpendicular to the lock body axis; and
the bolt is coaxial with the lock body axis.

10. The helmet lock of claim 9, wherein:
the bolt has a bolt radius;
the strap ring has a ring diameter; and
the groove extends into the lock body a distance past the lock body axis of at least the bolt radius plus the ring diameter.

11. The helmet lock of claim 1, wherein the lock body is a machined billet lock body.

12. A helmet lock comprising:
a lock body;
a round mounting surface end of the lock body providing a mounting surface for the lock body, the mounting surface end including attachment holes perpendicular to the mounting surface for cooperation with an attaching feature residing at the end of a grip;
a groove in the lock body adapted to accept a helmet strap ring, wherein the attachment holes include stepped recesses to a depth beyond the groove; and
a cylindrical lock mechanism residing perpendicular to the mounting surface and including a bolt adapted to advance through the groove, wherein the bolt is positioned to pass through the strap ring to thereby prevent removal of the strap ring from the lock body.

13. The helmet lock of claim 12, wherein the lock body is adapted to attach to a handlebar grip having an accessory attachment feature on an end of the grip.

14. The helmet lock of claim 13, wherein the lock body is adapted to attach to a handlebar grip having four threaded holes for accessory attachment on the end of the grip, wherein the lock body includes attachment holes aligned with the four threaded holes.

15. The helmet lock of claim 12, wherein the lock body includes an alignment feature for aligning the lock body with the grip.

16. The helmet lock of claim 12, wherein:
the lock body is a truncated conical lock body;
the lock body has a lock body axis;
the groove is substantially perpendicular to the lock body axis; and
the bolt is substantially coaxial with the lock body axis.

17. The helmet lock of claim 12, wherein the lock body is a machined billet lock body.

18. A helmet lock comprising:
a handlebar grip body having a mounting end, a gripping portion, and an outside end opposite the mounting end;
a groove in the grip body, wherein the groove is proximal to the outside end, and adapted to accept a helmet strap ring; and
a cylindrical lock mechanism residing coaxial with the grip body and having a bolt adapted to advance through the groove, wherein the bolt is positioned to pass through the strap ring to thereby prevent removal of the strap ring from the grip body.

19. The helmet lock of claim 18, wherein:
the handlebar grip body has a handlebar grip body axis;
the groove is substantially perpendicular to the handlebar grip body axis; and
the bolt is substantially coaxial with the handlebar grip body axis.

20. The helmet lock of claim 18, said cylindrical lock mechanism for locking the bolt in an unlocked position wherein the bolt is extracted from the groove, and in a locked position wherein the bolt extends into the groove.

\* \* \* \* \*